(12) United States Patent
Delacroix et al.

(10) Patent No.: US 11,689,278 B2
(45) Date of Patent: Jun. 27, 2023

(54) STANDARDIZED CONNECTION INTERFACE BETWEEN AIRCRAFT EQUIPMENT AND A WIRELESS DATA TRANSMISSION NETWORK EXTERNAL TO THE AIRCRAFT

(71) Applicant: DASSAULT AVIATION, Paris (FR)

(72) Inventors: Charles Delacroix, Saint Cloud (FR); Hugues Abrassart, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 17/409,000

(22) Filed: Aug. 23, 2021

(65) Prior Publication Data
US 2022/0069900 A1    Mar. 3, 2022

(51) Int. Cl.
*H04B 7/185* (2006.01)
*H04W 40/24* (2009.01)

(52) U.S. Cl.
CPC ...... *H04B 7/18506* (2013.01); *H04W 40/248* (2013.01)

(58) Field of Classification Search
CPC .......................... H04B 7/18506; H04W 40/248
See application file for complete search history.

(56) References Cited

U.S. PATENT DOCUMENTS

| | | | |
|---|---|---|---|
| 2005/0286452 A1 | 12/2005 | Hardgrave et al. | |
| 2010/0293292 A1 | 11/2010 | Tamalet et al. | |
| 2011/0222534 A1 * | 9/2011 | Kurita | H04L 45/60 370/389 |
| 2013/0336213 A1 * | 12/2013 | Mimura | H04L 47/27 370/328 |

FOREIGN PATENT DOCUMENTS

| | | | |
|---|---|---|---|
| AU | 7246598 A | * | 10/1998 |
| EP | 2023685 A1 | | 2/2009 |
| FR | 2922397 A1 | | 4/2009 |
| FR | 2947978 A1 | | 1/2011 |

OTHER PUBLICATIONS

Search Report for priority application FR 2008702.

* cited by examiner

*Primary Examiner* — Samina F Choudhry

(57) ABSTRACT

A standardized connection interface between aircraft equipment and a wireless data transmission network external to the aircraft includes a router. The router includes a mapping table between a plurality of connectivity link classes and one or more connectivity links associated with each connectivity link class. The router is configured to transmit the list of active connectivity link classes to each item of equipment, to establish a transmission of data between the piece of equipment and at least one wireless data transmission network (14A to 14E) through an active connectivity link, based on the list of active connectivity link classes and a list of connectivity link classes to which the piece of equipment is authorized to connect.

16 Claims, 3 Drawing Sheets

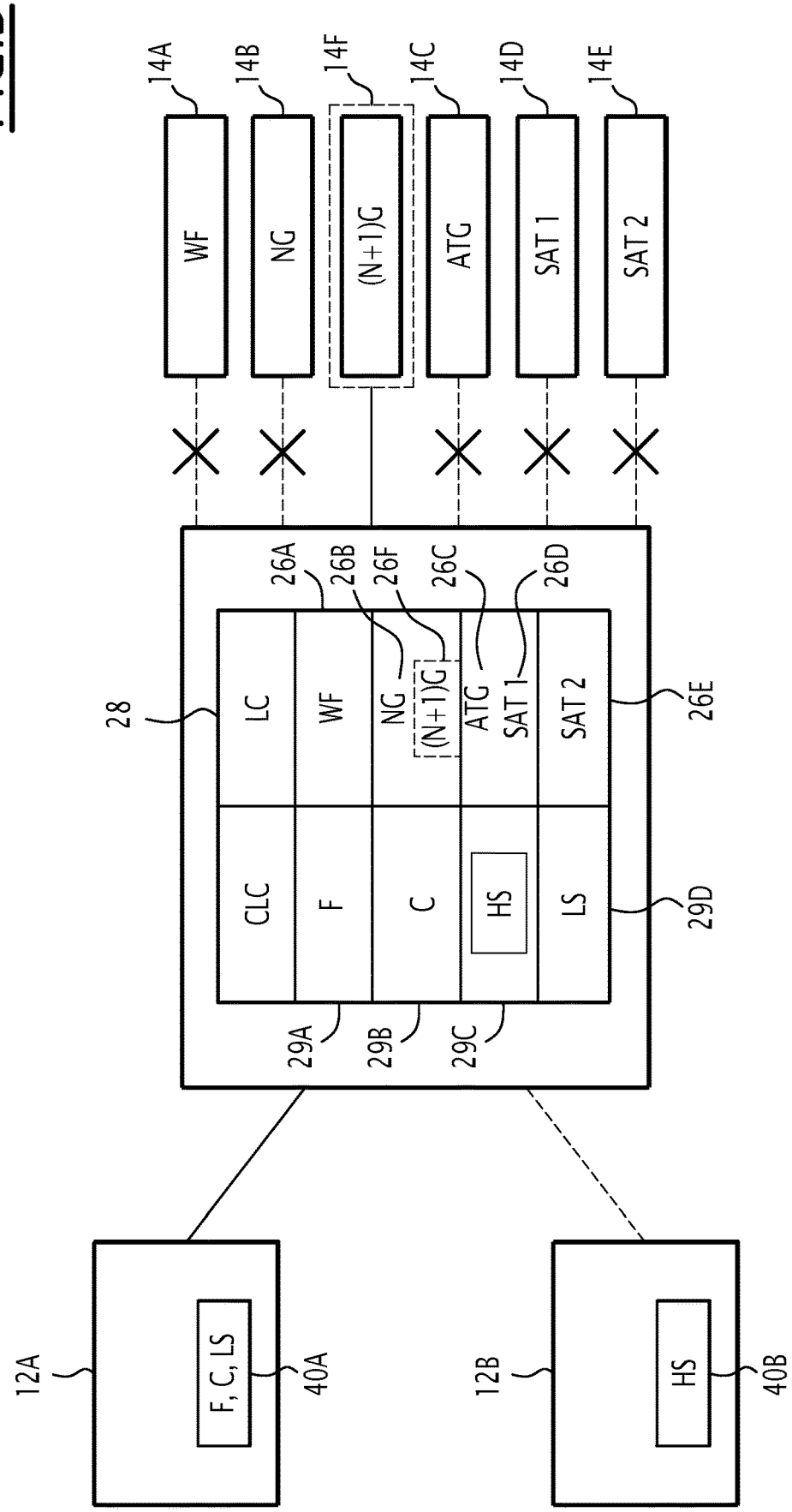

STANDARDIZED CONNECTION INTERFACE BETWEEN AIRCRAFT EQUIPMENT AND A WIRELESS DATA TRANSMISSION NETWORK EXTERNAL TO THE AIRCRAFT

The present disclosure relates to an aircraft connection interface, able to connect at least one piece of equipment in the aircraft to a wireless data transmission network external to the aircraft, the interface comprising:
 a router, able to connect to a plurality of wireless data transmission networks via a connectivity link specific to each wireless data transmission network, the or each piece of equipment being able to connect to the router.

This interface is intended in particular for the implementation of communications in an aircraft, in particular between the aircraft cockpit or cabin and external data transmission networks.

BACKGROUND

Modern aircraft are generally equipped with equipment that must connect to wireless transmission networks, in particular to access databases or external content, to receive data and store them in the aircraft, to export data collected in the aircraft and/or to update software or programs present in the aircraft.

For this purpose, it is known to equip the aircraft with a router enabling connection to different data transmission networks on the ground or in flight, depending on the position of the aircraft.

For example, when the aircraft is on the ground, in the field, it can generally connect to a Wi-Fi network, or to a cellular network, especially a 3G cellular network.

In flight, the aircraft can connect to air-to-ground (ATG) radio networks or satellite transmission networks, whose transmission speed and cost vary, depending on the network.

A user connected to the aircraft router can therefore use one or more connectivity links to each of the available networks, depending on the context, the data transmission speed required, the volume of data to be exchanged, and/or the cost associated with the data transmission.

For example, when the piece of equipment is a comfort piece of equipment such as an in-flight entertainment ("IFE") system, it must regularly load heavy files, in particular videos.

When the piece of equipment is a piece of aircraft maintenance piece of equipment, it must send maintenance data to a ground station.

Among the connectivity links available each time in the router, only one connectivity link is active at a given time, to connect a piece of equipment to an active wireless transmission network. The router generally chooses the active connectivity link according to a priority list, which depends in particular on the speed required and the cost of the communication.

Each piece of equipment that can connect to the router therefore has a list of connectivity links that it is authorized to connect to. This avoids using a large part of the bandwidth when it is relatively low and/or avoids incurring high connection costs.

For example, it is preferable to avoid downloading video files through an in-flight satellite connectivity link while they can be preferably downloaded through a free connectivity link such as a Wi-Fi network available on the ground. Thus, the transfer of data is carried out at the best time, avoiding additional costs for the user and/or the aircraft operator.

An interface of the type mentioned above is thus adequate to control the cost and the available communication bandwidth.

However, it is not completely satisfactory. As such, the list of connectivity links authorized for each piece of equipment is often loaded directly in the piece of equipment.

In some cases, the aircraft operator may want to add an additional connectivity link because the router is capable of connecting to a new type of data transmission network, for example.

When a new connectivity link is added to the router, or, conversely, when a connectivity link is removed, it is necessary to modify each piece of equipment to take into account this new link, and to define whether the user will be authorized to use this connectivity link, at the level of each piece of equipment.

Because this equipment is typically maintained by vendors external to the aircraft operator, coordination with each equipment vendor is required to update the piece of equipment, which incurs substantial logistics, update delays, possibly aircraft downtime, and modification costs.

SUMMARY

An aim of the present disclosure is therefore to provide an interface for connecting equipment within an aircraft with external transmission networks, which accommodates multiple connectivity links and which does not require substantial maintenance when changing the available connectivity links.

A connection interface as defined above is provided, characterized in that the router includes a mapping table between a plurality of connectivity link classes and one or more connectivity links associated with each connectivity link class, the router being able to establish a list of active connectivity link classes by determining the or each active connectivity link between a wireless data transmission network and the router, and using the mapping table for this, the router being able to transmit the list of active connectivity link classes to the or each piece of equipment, to establish a data transmission between the piece of equipment and at least one wireless data transmission network through an active connectivity link, as a function of the list of active connectivity link classes and a list of connectivity link classes to which the piece of equipment is authorized to connect.

The communication interface according to the present disclosure may comprise one or more of the following features, taken alone or in any technically feasible combination:
 at least one connectivity link class is associated in the mapping table with at least two connectivity links using distinct transmission protocols;
 at least one connectivity link class in the mapping table is defined according to the data transmission speed via the wireless transmission network;
 a connectivity link class in the mapping table is defined according to the cost of communication via the wireless data transmission network;
 a connectivity link class in the mapping table is defined according to the type of communication via the wireless data network;
 the connectivity link classes are selected from a free communication class, a cellular communication class, a high-speed communication class, and a low-speed communication class;

the connectivity links are selected from a Wi-Fi connectivity link, a cellular connectivity link, in particular by 1G, 2G, 3G, 4G or/and 5G protocol, an air-to-ground connectivity link, a satellite connectivity link, in particular a SATCOM Ka link or a SATCOM L link;

the router is able to determine that a connectivity link class is active when at least one connectivity link associated with the connectivity link class is active, to allow data transmission between the wireless data transmission network associated with the connectivity link and the router.

It is an object of the present disclosure to provide an aircraft communication assembly having an interface as defined above and at least one piece of equipment able to connect to the router.

The assembly according to the present disclosure may comprise one or more of the following features, taken alone or in any technically possible combination:

it comprises on-board equipment or roaming piece of equipment, the router being on-board.

the piece of equipment contains a capability information on relative to the connection capability to each connectivity link class, the list of connectivity link classes to which the piece of equipment is authorized to connect being obtained from the capability information;

the piece of equipment is able to query the router to obtain the list of active connectivity link classes, and to compare the list of active connectivity link classes transmitted by the router with the list of connectivity link classes to which the piece of equipment is authorized to connect, to determine whether at least one active connectivity link class belongs to the list of connectivity link classes to which the piece of equipment is authorized to connect;

when the piece of equipment is authorized to transmit data via at least one class of active connectivity links, the piece of equipment is able to transmit data to the router via a data transmission link internal to the aircraft, the data then being transmitted by the router to at least one data transmission network by implementing at least one active connectivity link of an active connectivity link class and, when the piece of equipment is not authorized to implement data transmission via the at least one active connectivity link class, the piece of equipment blocks any transmission of data to the router via the internal data transmission link of the aircraft.

A method of transmitting data in an aircraft is also provided, including the following steps:

providing a connection interface, as defined above, connecting at least one piece of equipment to the router;

the router establishing a list of active connectivity link classes, by determining the or each active connectivity link between a wireless data transmission network and the router, and using the mapping table, transmitting the list of active connectivity link classes to the or each piece of equipment, establishing data transmission between the piece of equipment and at least one wireless data transmission network through an active connectivity link of the router, based on the list of active connectivity link classes and a list of connectivity link classes to which the piece of equipment is authorized to connect.

A method for updating a connection interface as defined above is also provided, including the following steps:

establishing a new connectivity link between the router and a new wireless data network;

modifying the mapping table, to associate the new connectivity link with an existing connectivity link class, without intervention on the or each piece of equipment or/and including the following steps:

deleting a connectivity link between the router and a wireless data network;

modifying the mapping table to deleting the association between the deleted connectivity link and the or each connectivity link class associated with the deleted connectivity link, without intervention on the or each piece of equipment.

BRIEF DESCRIPTION OF THE FIGURES

The present disclosure will be better understood from the following description, given only as an example, and made with reference to the attached drawings, in which:

FIG. 3 illustrates the updating of the mapping table when a new connectivity link is added.

DETAILED DESCRIPTION

Figure 1:
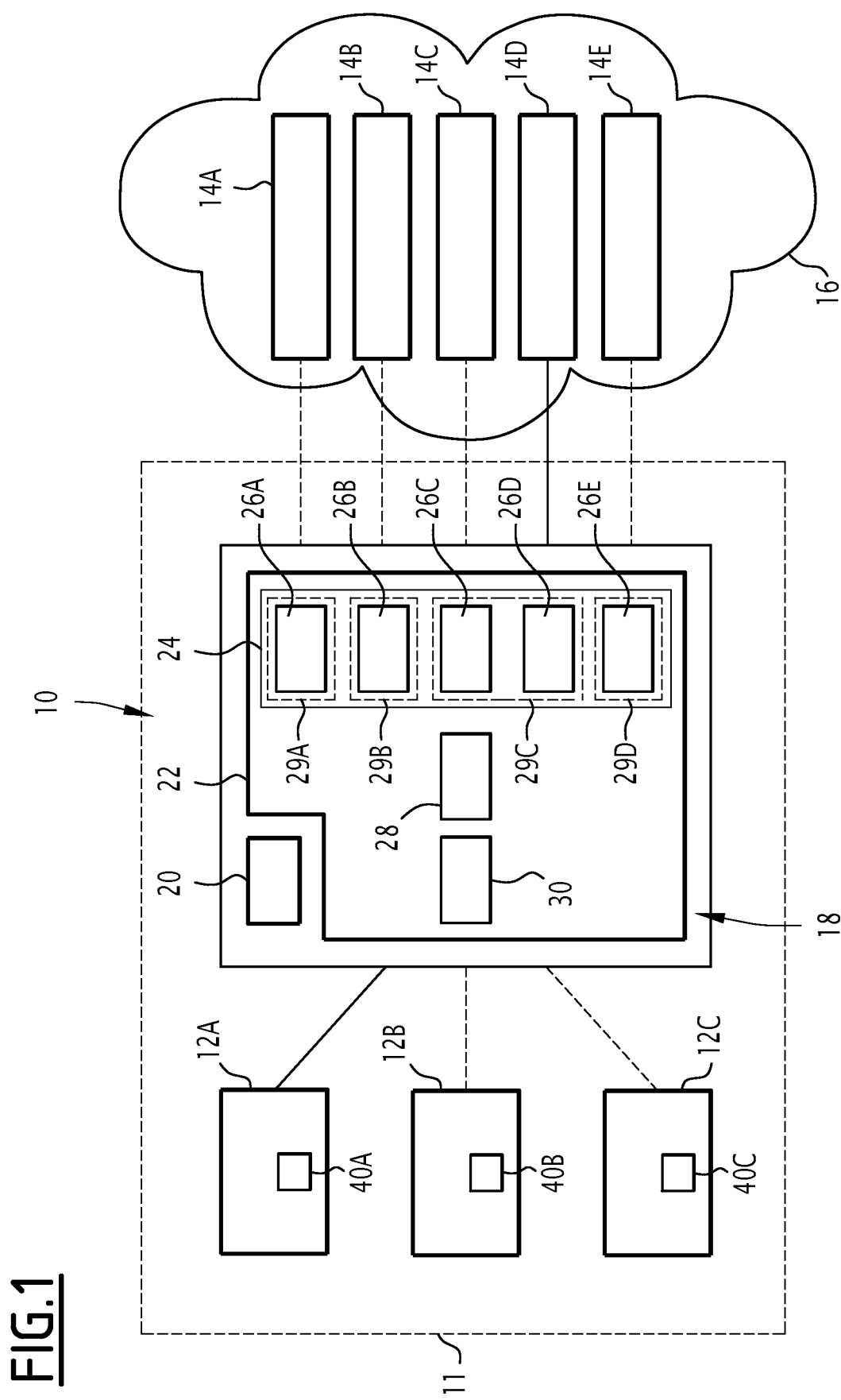
FIG. 1 is a schematic view of a connection interface according to the present disclosure.

A first connectivity interface 10 according to the present disclosure is schematically illustrated in FIG. 1.

The interface 10 is intended to be implemented in an aircraft 11 to connect equipment 12A, 12B, 12C, present in the aircraft 11 to wireless data transmission networks 14A to 14E located outside the aircraft 11.

The aircraft 11 is a civil aircraft, for example, a passenger aircraft, in particular a business jet.

The wireless transmission networks 14A through 14E are intended to transmit data between equipment 12A through 12C present in the aircraft 11 and infrastructures 16 external to the aircraft 11.

The external infrastructures comprise servers in particular, especially internet servers.

The wireless transmission networks 14A to 14E to which the interface 10 is likely to connect include, a terrestrial Wi-Fi type of network 14A, for example.

Such a network is operated by a protocol according to the IEEE 802.11 group of standards, for example. The Wi-Fi network range is generally several tens of meters indoors, or outdoors, and from one or more terminals. The data transfer is done by electromagnetic waves in frequency ranges defined in the above standards.

The transmission network 14A is accessible to the aircraft when it is on the ground, for example, particularly in the field.

Another wireless transmission network 14B to which the connection interface 10 may connect is a cellular network. The cellular network is of the 1G, 2G type as defined by the GSM standard for example, or a 3G network as defined by the UMTS, CDMA 2000, EDGE standards. In a variant, the cellular network is a 4G type network, as defined by the SDE standard or a 5G type network as defined by the 5GNR standard.

The cellular networks are generally accessible when the aircraft 11 is on the ground.

Another wireless transmission network 14C to which the connection interface 10 is likely to connect is an air-to-ground type network, such as an Air To Ground or ATG radio network.

Another wireless transmission network 14D to which the connection interface 10 is likely to connect is a high-speed satellite transmission network such as a SATCOM-type network operating on the Ka-band.

Another wireless transmission network 14E to which the connection interface 10 is likely to connect is a low-speed satellite transmission network such as a SATCOM-type network operating on the L-band.

The connection interface 10 is onboard (or embedded) in the aircraft 11. By "onboard the aircraft", it is meant that the connection interface 10 meets the certification requirements of the aircraft 11. It is mounted in the aircraft 11, to be kept there permanently during a flight of the aircraft.

In the example shown in FIG. 1, the interface 10 includes a router 18 comprising at least one processor 20 and at least one memory 22 comprising software modules that can be executed by the processor 20 to implement functions.

In a variant, the modules are made as programmable logic components, at least partially, or as dedicated integrated circuits.

In the example shown in FIG. 1, the router 18 includes a module 24 for connecting to each of the networks 14A to 14E accessible to the aircraft, including a connectivity link 26A to 26E specific to the network 14A to 14E for each network 14A to 14E.

According to the present disclosure, the router 18 further includes a mapping table 28, defining a correspondence between a plurality of classes 29A to 29D of connectivity links and each connectivity link 26A to 26E associated with the connectivity link class 29A to 29D. It also comprises a module 30 for connecting to the piece of equipment 12A, 12B, 12C based on the available connectivity link class 29A to 29D.

The connection module 24 is able to determine whether one or more networks 14A to 14E are available in the vicinity of the aircraft 11, for connection to the router 18, and is further able to establishing a connection with the or each available network 14A to 14E, by allowing identification of the router 18 on the transmission network 14A to 14E, for example.

It is thus able to switch each connectivity link 26A to 26E from an inactive configuration, when no communication is possible through the connectivity link 26A to 26E associated with the network 14A to 14E, and an active configuration, when communication between the network 14A to 14E and the router 18 is available, through the connectivity link 26A to 26E.

As noted above, with reference to FIG. 2, the mapping table 28 establishes a correspondence between predefined connectivity link classes 29A through 29D, intended for use by the piece of equipment 12A, 12B, 12C of the aircraft 11, and connectivity links 26A through 26E, to the respective networks 14A through 14E.

In this example, each connectivity link class 29A through 29D is associated with at least one connectivity link 26A through 26E. At least one connectivity link class 29C is associated here with a plurality of connectivity links 26A, 26B.

Each connectivity link 26A to 26E further preferably belongs to only one connectivity link class 29A to 29D.

More generally, the mapping table 28 may comprise a connectivity link class that is empty, i.e., not associated with any connectivity link 26A through 26E available at this time on the aircraft 11.

In a variant, each connectivity link class 29A through 29D is associated with at most a single connectivity link 26A through 26E.

In any case, this enables a standardized fixed list of connectivity link classes 29A through 29D to be defined, for example common to a fleet of aircraft. For each connectivity link class 29A through 29D in the standardized list, each aircraft 11 has either no connectivity links, a single connectivity link, or multiple connectivity links associated with the connectivity links class 29A through 29D, as defined in the mapping table 28.

Preferably, the connectivity link classes 29A through 29D are defined in the mapping table 28 based on connection speed, connection type, and/or connection cost.

Figure 2:
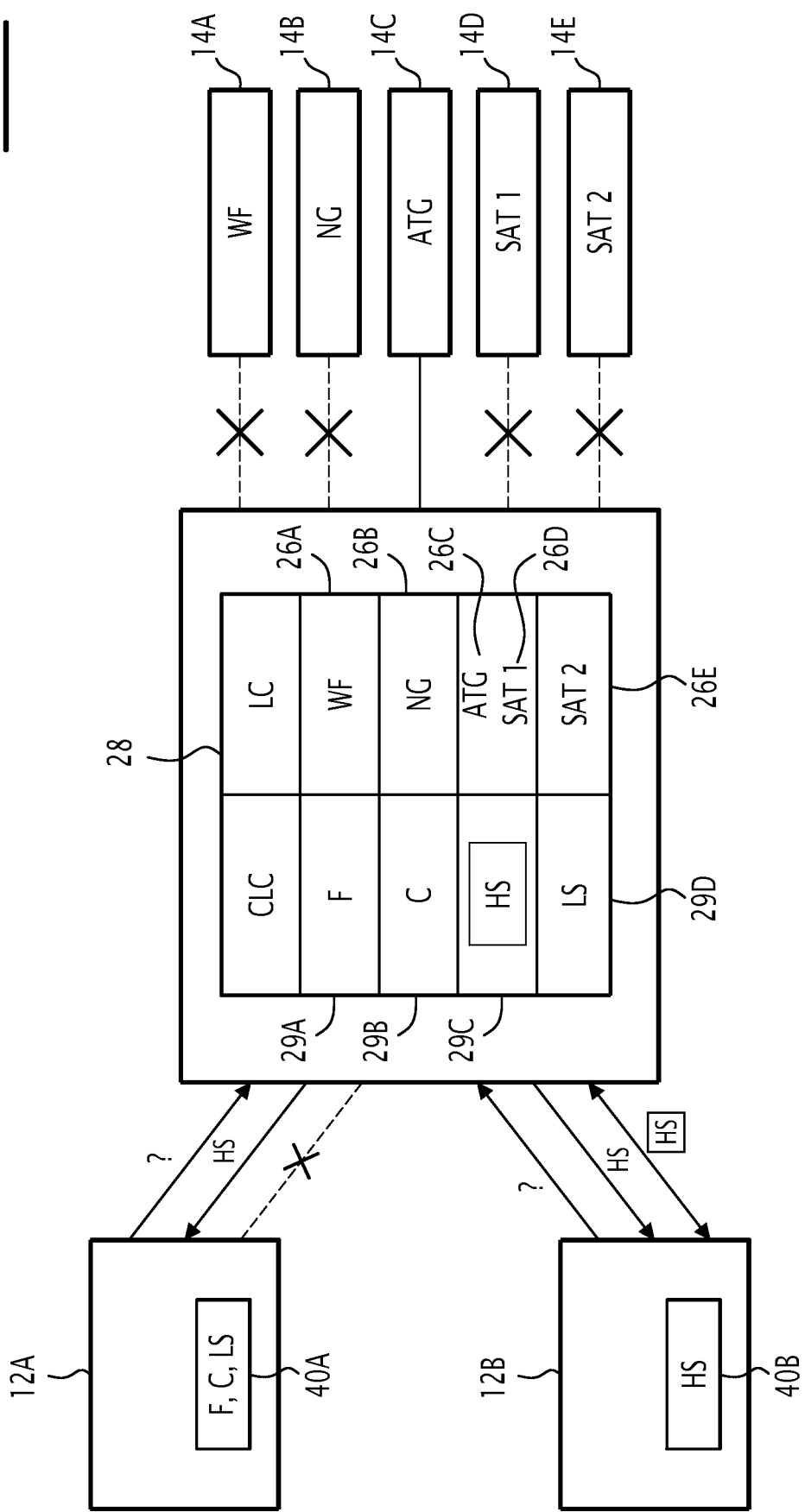
FIG. 2 is a synoptic view of a connection assisted by the interface of FIG. 1, using a mapping table relating connectivity link classes to available connectivity links.

In an example shown in FIG. 2, the mapping table 28 includes four connectivity link classes 29A through 29D.

A first connectivity link class 29A is a "free" connection class (represented by the letter F in FIG. 2), for example. It is associated with the connectivity link 26A to the terrestrial network 14A, advantageously to the Wi-Fi type terrestrial network 14A.

A second connectivity link class 29B is a cellular communication class (represented by the letter C in FIG. 2). It is associated here with the connectivity link 26B to the cellular network 14B.

A third connectivity link class 29C is a class defined in terms of connection speed, such as a high-speed class (represented by the letters HS in FIG. 2).

In this example, the third connectivity link class 29C is associated with two connectivity links 26C, 26D, namely the connectivity link 26C to an air-to-ground network 14C, and a connectivity link 26D to a high-speed satellite network 14D.

Finally, the fourth connectivity link class 29D is a low-speed connection class ("low speed", represented by the letters LS in FIG. 2). It is associated with connectivity link 26E to the low-speed satellite transmission network 14E.

The connectivity link classes 29A through 29D are generic and permanent.

Thus, as will be discussed below with reference to FIG. 3, if an additional connectivity link 26F is added to the mapping table 28 to allow the connection interface 10 to connect to another type of transmission network 14F, that additional connectivity link 26F is associated with an already existing connectivity link class 29D. Similarly, if a connectivity link is deleted from the connection interface 10, to be replaced by another connectivity link for example, the new connectivity link is also associated with an existing connectivity link class.

A connectivity link class 29A through 29D is active when at least one connectivity link 26A through 26E within the class 29A through 29D is active to allow data transmission through the connection interface 10 via the connectivity link 26A through 26E.

In contrast, a connectivity link class 29A to 29D is inactive when all connectivity links 26A to 26E within the class 29A to 29D are inactive, no transmission through a connectivity link 26A to 26E of the connectivity link class 29A to 29D then being possible. This is also the case if the connectivity link class 29A to 29D is not associated with any connectivity link 26A to 26E in the mapping table 28.

The connection module 30 at each piece of equipment 12A to 12C is able to determine a list of active connectivity link classes 29A to 29D at each time by determining which connectivity links 26A to 26E are active, and by querying the mapping table 28, to determine to which class 29A to 29D each respectively active connectivity link 26A to 26E belongs.

The connection module 30 is able to receive a request from each piece of equipment 12A to 12C requesting the list of active connectivity link classes 29A to 29D within the connection interface 10, and, in response, transmitting the list of classes 29A to 29B of connectivity links active within the connection interface 10 to the piece of equipment 12A to 12C.

When the piece of equipment 12A-12C is authorized to transmit data via at least one active connectivity link class 29A-29D, the piece of equipment 12A-12C is then able to transmit data to the router 18 via an internal aircraft data transmission link, the data then being transmitted by the router 18 to at least one data transmission network 14A-14E, implementing at least one active connectivity link 26A-26E of an active connectivity link class 29A-29D.

In contrast, when the piece of equipment 12A through 12C is not authorized to transmit data via at least one active connectivity link class 29A through 29D, the piece of equipment 12A through 12C does not transmit data to the router 18 via the aircraft internal data transmission link 11.

The aircraft internal data transmission link 11 is a data transmission network between the router 18 and each piece of equipment 12A, 12B, such as a wireless transmission network, including WIFI or Bluetooth or a wired transmission network installed in the aircraft 11.

The piece of equipment 12A to 12C is an onboard piece of equipment, for example, permanently mounted in the aircraft 11, and meeting the certification requirements. In a variant, the piece of equipment 12A to 12C is a non onboard piece of equipment (or not embedded), not meeting certification requirements, such as roaming equipment brought into the aircraft by an occupant of the aircraft.

Advantageously, the piece of equipment 12A through 12C include in-flight entertainment systems, systems permanently mounted in the aircraft, aircraft maintenance systems, whether fitted onboard or not, and mobile equipment.

The piece of equipment 12A through 12C include a computer, a laptop, a tablet, a cell phone, for example.

Each piece of equipment 12A through 12C includes a piece of equipment interface 40A, 40B, 40C able to query the connection module 30 to obtain a list of connectivity link classes 29A through 29D active at the time of querying.

The piece of equipment interface 40A through 40C contains at least one capability information, defining the or each connectivity link class 29A through 29D by which the piece of equipment 12A through 12C is capable of connecting to a wireless transmission network 14A through 14E through the interface 10.

In the example shown in FIG. 2, the interface 40A of the piece of equipment 12A contains a capability information for connecting to data transmission networks via the free connection class 29A, the cellular connection class 29B, or to the low-speed connection class 29D.

The piece of equipment 12A is thus prevented from connecting to the high-speed connection class 29C.

Also in the example of FIG. 2, the piece of equipment 12B includes a piece of equipment interface 40B containing a capability information for connecting to the high-speed connection class 29C.

The piece of equipment interface 40A-40C, on the other hand, lacks any information about the particular connectivity links 26A-26E that the piece of equipment 12A-12C can use within each connectivity link class 29A-29D.

The capability information is exclusively capability of connection to a connectivity link class 29A through 29D, with no information about capability of connection to a specific connectivity link 26A through 26E within the class in question.

Thus, as will be discussed below, when adding a new connectivity link 26F within the interface 10, that connectivity link 26F is associated with an existing connectivity link class 29B and no changes are required on the piece of equipment 12A, 12B, particularly in their piece of equipment interfaces 40A, 40B. Indeed, the connectivity link class 29B associated with the new connectivity link 26F is already identified in the capability information present within the piece of equipment 12A, 12B.

A method of transmitting data between equipment 12A, 12B in the aircraft 11 and a wireless data transmission network 14A to 14E external to the aircraft 11, by means of the connection interface 10 according to the present disclosure, will now be described.

Initially, using its connection module 24, the connection interface 10 determines the or each wireless data transmission network 14A through 14E available in the vicinity of the aircraft 11.

The router 18 connects to at least one available network 14A through 14E, via the connection module 24 to that network 14A through 14E, for example by providing credentials and/or a password and activating the connectivity link 26A through 26E corresponding to the network 14A through 14E. Preferably, when multiple networks 14A through 14E are available, the router 18 connects to only one of them, based on a predefined order of preference.

Thus, at least one communication link is established between the router 18 and a wireless transmission network 14A through 14E.

In the example shown in FIG. 2, the air-to-ground network 14C is the only one available. The connection module 24 connects to it via the connectivity link 26C.

At any time or upon request, the connection module 30 at each piece of equipment 12A-12C queries the mapping table 28 to determine the or each active connectivity link class 29A-29D and the or each inactive connectivity link class 29A-29D, by determining the or each class 29A-29D having at least one active connectivity link 26A-26E among the one or more connectivity links associated with the class 29A-29D.

Thus, the connection module 30 establishes a list of active connectivity link classes 29A through 29D at each time, generally including a single active connectivity link class 29A through 29D and optionally a list of inactive connectivity link classes 29A through 29D.

For example, in FIG. 2, the connection module 30 establishes that the high-speed connection class 29C is active and the free connection class 29A, the cellular connection class 29B, and the low-speed connection class 29D are inactive.

When a piece of equipment 12A, 12B needs to connect to a wireless transmission network 14A through 14E via the router 18, it issues a request to the connection module 30 and queries the connection module 30 to determine the or each active connectivity links class 29A through 29D.

Then, the connection module 30 transmits the list of the or each active connectivity link class 29A through 29D to the piece of equipment 12A, 12B, established from the mapping table 28. If no connectivity link class 29A through 29D is active, the connection module 30 transmits the information that no class is active to the piece of equipment 12A, 12B.

The piece of equipment interface 40A, 40B of the piece of equipment 12A, 12B compares the or each active connectivity link class 29A through 29D received from the router 18 to the or each connectivity link class 29A through 29D to which the piece of equipment 12A is authorized to connect, obtained from the capability information stored in the piece of equipment 12A, 12B.

If at least one active connectivity link class 29A through 29D matches a connectivity link class 29A through 29D to which the piece of equipment 12A, 12B is authorized to connect, the piece of equipment 12A, 12B transmits data to the router 18 via the internal aircraft transmission link 11. Then, the router 18 transmits the data received from the piece of equipment 12A, 12B to a network 14A through 14E, using an active connectivity link 26A through 26E of an active connectivity link class 29A through 29D.

A communication link is thus established between the piece of equipment 12A, 12B and at least one network 14A to 14E, using an active connectivity link 26A to 26E of an active connectivity link class 29A to 29D to which the piece of equipment 12A, 12B is authorized to connect.

In contrast, if no active connectivity link class 29A through 29D corresponds to a connectivity link class 29A through 29D to which the piece of equipment 12A, 12B is authorized to connect, the piece of equipment 12A, 12B does not transmit data to the router 18 and remains disconnected from each network 14A through 14E.

In the example shown in FIG. 2, the piece of equipment 12A receives the information that the high-speed connection class 29C is active and the other connectivity link classes 29A, 29B, 29D are inactive. Since the piece of equipment interface 40A contains the capability information that the piece of equipment 12A is authorized to connect only to the classes 29A, 29B, 29D, no data is transmitted to the router 18 and therefore no communication is established between the piece of equipment 12A and the active transmission network 14C.

The piece of equipment 12B also receives the information that the high-speed connection class 29C is active. Based on the capability information present in the piece of equipment interface 40B that the piece of equipment 12B is authorized to connect to the high-speed connection class 29C, the piece of equipment 12B transmits data to the router 18 which retransmits it to the network 14C via the connectivity link 26C. Thus, a communication is established between the piece of equipment 12B and the transmission network 14C via the router 18.

With reference to FIG. 3, when a new connectivity link 26F is installed between the connection interface 10 and another type of wireless data transmission network 14F (corresponding to a (N+1)G network in the figure, for example), the mapping table 28 is modified. The new connectivity link 26F (for the (N+1)G network in this example) is then mapped to an already existing connectivity link class 29A through 29D, in this case to the cellular communication class 29B.

This modification is made at the connection interface 10 within the aircraft 11, without the need to modify the piece of equipment 12A, 12B, in particular their equipment interfaces 40A, 40B.

The capability information already present in the interfaces 40A, 40B is sufficient to determine whether each piece of equipment 12A, 12B is able to use the connectivity link class 29B associated with the new connectivity link 26F, and thus, if so, to allow a connection to the new network 14F via the new connectivity link 26F.

By defining connectivity link classes 29A to 29D, by a mapping table 28, between the classes 29A to 29D and the connectivity links 26A to 26E contained in each class 29A to 29D, the interfacing between the piece of equipment 12A to 12C intended to connect to the connection interface 10 and the connection interface 10 is simplified, even if the transmission networks 14A to 14F able to connect to the connection interface 10 are modified, to allow the connection to a new type of network 14F or to delete a network.

The connectivity link classes 29A through 29D are defined based on the characteristics of the connectivity links 26A through 26E contained therein, such as cost, throughput offered, communication type or/and ground or airborne availability. In an alternative embodiment, the connectivity link classes 29A through 29D include a class that has energy performance and/or environmental impact of the connectivity links 26A through 26E as a criterion.

The connectivity link classes 29A through 29D are permanently defined, even if changes occur within the connectivity links 26A through 26E available to the router 18, either because new links are added or because some links are removed or replaced.

Thus, the piece of equipment 12A through 12C do not need to be modified; the changes that need to be made when a connectivity link 26F is added or deleted are made at the router 18, specifically in the mapping table 28.

The connectivity interface 10 makes it much easier to configure the piece of equipment 12A through 12C using the connectivity, such as in-flight entertainment equipment or aircraft maintenance equipment 11. As a result, costly and complex modification requests to coordinate on the piece of equipment 12A through 12C are no longer required, thereby decreasing costs and increasing the uptime of the aircraft 11.

What is claimed is:

1. An aircraft connection interface, configured to connect at least one piece of equipment in an aircraft to a wireless data transmission network external to the aircraft, the aircraft connection interface comprising:
 a router, configured to connect to a plurality of wireless data transmission networks via a connectivity link specific to each wireless data transmission network, the at least one piece of equipment being configured to connect to the router,
 the router comprising a mapping table, the mapping table associating a plurality of connectivity link classes and one or more of the connectivity links associated with each connectivity link class, the router being configured to establish a list of active connectivity link classes by determining which of the at least one connectivity link is active between one or more of the wireless data transmission networks and the router, and by using the mapping table,
 the router being configured to transmit the list of active connectivity link classes to the at least one piece of equipment, to establish a data transmission between the piece of equipment and at least one of the wireless data transmission networks through an active connectivity link, based on the list of active connectivity link classes and on a list of classes of connectivity links to which the piece of equipment is authorized to connect.

2. The aircraft connection interface according to claim 1, wherein at least one of the connectivity link classes is associated in the mapping table with at least two of the connectivity links using distinct transmission protocols.

3. The aircraft connection interface according to claim 1, at least one of the connectivity link classes in the mapping table is defined based on a data transmission speed via the wireless data transmission network.

4. The aircraft connection interface according to claim 1, wherein at least one of the connectivity link classes in the mapping table is defined based on a cost of communication via the wireless data transmission network.

5. The aircraft connection interface according to claim 1, wherein at least one of the connectivity link classes in the mapping table is defined based on a type of communication via the wireless data transmission network.

6. The aircraft connection interface according to claim 1, wherein the connectivity link classes are selected from a free communication class, a cellular communication class, a high-speed communication class, and a low-speed communication class.

7. The aircraft connection interface according to claim 1, wherein the connectivity links are selected from a Wi-Fi connectivity link, a cellular connectivity link, an air-to-ground connectivity link, and a satellite connectivity link.

8. The aircraft connection interface according to claim 1, wherein the router is configured to determine that a connectivity link class among the connectivity link classes is active, when at least one connectivity link associated with the connectivity link class is active to allow data transmission between the wireless data transmission network associated with the connectivity link and the router.

9. An aircraft communication assembly comprising:
the aircraft connection interface according to claim 1; and
at least one piece of equipment configured to connect to the router.

10. The assembly according to claim 9, wherein the piece of equipment is an on-board equipment or a roaming equipment, the router being onboard.

11. The assembly according to claim 9, wherein the piece of equipment contains a capability information relative to a connection capability of the equipment to each connectivity link class, the list of connectivity link classes to which the piece of equipment is authorized to connect being obtained from the capability information.

12. The assembly according to claim 11, wherein the piece of equipment is configured to query the router to obtain the list of active connectivity link classes, and to compare the list of active connectivity link classes transmitted by the router with the list of connectivity link classes to which the piece of equipment is authorized to connect, to determine whether at least one of the active connectivity link classes belongs to the list of connectivity link classes to which the piece of equipment is authorized to connect.

13. The assembly according to claim 12, wherein, when the piece of equipment is authorized to transmit data via at least one of the active connectivity link classes, the piece of equipment is configured to transmit data to the router via an aircraft internal data transmission link, the data then being transmitted by the router to at least one of the wireless data transmission networks, implementing at least one active connectivity link of an active connectivity link class and wherein, when the piece of equipment is not authorized to transmit data via at least one active connectivity link class, the piece of equipment blocks any transmission of data to the router via the aircraft internal data transmission link.

14. A method of transmitting data in an aircraft, comprising:
providing the aircraft connection interface according to claim 1;
connecting at least one piece of equipment to the router;

the router establishing a list of active connectivity link classes by determining the at least one active connectivity link between one of the wireless data transmission networks and the router, and by using the mapping table;
transmitting the list of active connectivity link classes to the at least one piece of equipment; and
establishing data transmission between the piece of equipment and at least one of the wireless data transmission networks through an active connectivity link of the router, based on the list of active connectivity link classes and the list of connectivity link classes to which the piece of equipment is authorized to connect.

15. A method of updating the aircraft connection interface according to claim 1, comprising:
establishing a new connectivity link between the router and a new wireless data network;
modifying the mapping table to associate the new connectivity link with an existing one of the connectivity link classes, without intervening on the at least one piece of equipment;
or/and the method comprising:
deleting a connectivity link between the router and one of the wireless data transmission networks;
modifying the mapping table to remove the association between the deleted connectivity link and the at least one connectivity link class associated with the deleted connectivity link, without intervention on the at least one piece of equipment.

16. An aircraft connection interface, configured to connect at least one piece of equipment in an aircraft to a wireless data transmission network external to the aircraft, the aircraft connection interface comprising:
a router, configured to connect to a plurality of wireless data transmission networks via a connectivity link specific to each wireless data transmission network, the at least one piece of equipment being configured to connect to the router,
the router comprising a mapping table, the mapping table associating a plurality of connectivity link classes and one or more of the connectivity links associated with each connectivity link class, the router being configured to establish a list of active connectivity link classes by determining which of the at least one connectivity link is active between one or more of the wireless data transmission networks and the router, and by using the mapping table,
the router being configured to transmit the list of active connectivity link classes to the at least one piece of equipment, to establish a data transmission between the piece of equipment and at least one of the wireless data transmission networks through an active connectivity link, based on the list of active connectivity link classes and on a list of classes of connectivity links to which the piece of equipment is authorized to connect,
each connectivity link belonging to only one connectivity link class.

* * * * *

UNITED STATES PATENT AND TRADEMARK OFFICE
CERTIFICATE OF CORRECTION

| | | |
|---|---|---|
| PATENT NO. | : 11,689,278 B2 | |
| APPLICATION NO. | : 17/409000 | |
| DATED | : June 27, 2023 | |
| INVENTOR(S) | : Charles Delacroix et al. | |

It is certified that error appears in the above-identified patent and that said Letters Patent is hereby corrected as shown below:

On the Title Page

Item (30) Foreign Application Priority Data should read:
"Foreign Application Priority Data: August 26, 2020 (FR) 20 08702"

Signed and Sealed this
First Day of August, 2023

Katherine Kelly Vidal
*Director of the United States Patent and Trademark Office*